E. R. FERRY.
Spring Carriage Perch.
No. 96,216. Patented Oct. 26, 1869.
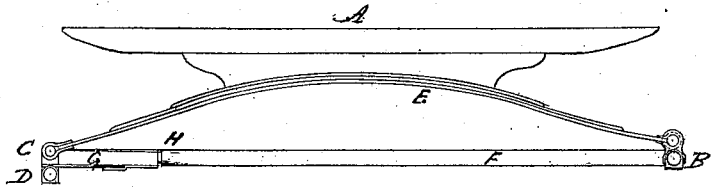
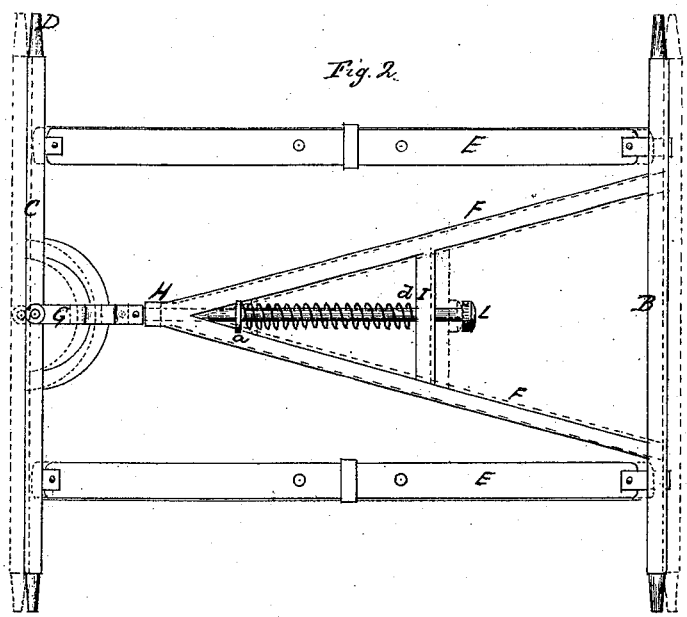

United States Patent Office.

E. R. FERRY, OF NEW HAVEN, CONNECTICUT, ASSIGNOR TO HIMSELF AND P. FERRY, OF SAME PLACE.

Letters Patent No. 96,216, dated October 26, 1869.

IMPROVED SPRING-PERCH FOR CARRIAGES.

The Schedule referred to in these Letters Patent and making part of the same.

*To all whom it may concern:*

Be it known that I, E. R. FERRY, of New Haven, in the county of New Haven, and State of Connecticut, have invented a new Improvement in Spring-Perch for Carriages; and I do hereby declare the following, when taken in connection with the accompanying drawings, and the letters of reference marked thereon, to be a full, clear, and exact description of the same, and which said drawings constitute part of this specification, and represent, in—

Figure 1, a side view, and, in

Figure 2, a view from the under side, looking up.

This invention relates to an improvement in the construction of side-spring carriages; and consists in combining, with the side-springs, which connect the rear axle to the forward spring-bar, a spring-perch, so that the draught will be light entirely upon the spring-perch, whereby the jolt occasioned by the sudden start of the horse, or by the wheel of the carriage meeting slight obstacles, will be entirely avoided; and also, the combined action of the springs will add materially to the ease of the carriage.

In order to the clear understanding of my invention, I will fully describe the same, as illustrated in the accompanying drawings.

A represents the body of the carriage;

B, the rear axle;

C, the forward spring-bar; and

D, the forward axle.

E E are the side springs, rigidly hinged to an eye upon the rear axle, and also to the spring-bar forward, so that as the springs are depressed, the forward spring-bar and rear axle will be correspondingly forced apart.

F F are the two arms of the perch, fixed to the rear axle.

G, the extension of the perch, which connects the perch to the fifth-wheel and forward axle.

The extension passes longitudinally through a socket, H, in the perch, as in fig. 2, and is made round, so as to turn freely therein, and extends back to any convenient distance through a bar, or other rest, I, having a head, L, formed on its rear end, to prevent its being drawn through the bar, and also passing through a collar, *a*, fixed to the perch, and a collar or stop, *d*, fixed to the spindle; and between the said collar *d* and the stop or support *a*, a spiral, or other suitable spring is arranged, so that the spring, resting upon the support *a* and against the collar *d*, holds the extension-bar back, as seen in fig. 2; but when a sufficient weight in the carriage depresses the springs, then the two axles will be forced asunder, and the spring on the extension will be depressed, as denoted by the broken lines in fig. 2; or, the horse drawing the carriage will, if he starts suddenly, draw the forward axle so as to compress the spring on the extension, and thus ease such sudden starts, the spring on the extension being sufficiently strong to withstand the ordinary draught of the carriage.

While I believe this construction to be the best arrangement of the spring on the extension, it will be evident to those skilled in this class of manufacture, that the spring may be otherwise applied to the extension, so as, in its action, to combine or co-operate with the side-springs.

By this arrangement, the links which are essential for the attachment of the side-springs in the common arrangement, are entirely avoided, such links, in this class of carriages, being the weakest part, and most liable to get out of order.

Having fully described my invention,

What I claim as new and useful, and desire to secure by Letters Patent, is—

In combination with the side-springs E E of a carriage, the two arms F F of the perch, extending from the axle to the socket H, the extension G passing through the socket H, and provided with a spring, to operate upon the said extension, as described.

E. R. FERRY.

Witnesses:
A. J. TIBBITS,
J. H. SHUMWAY.